(12) United States Patent
Legner

(10) Patent No.: US 7,614,226 B2
(45) Date of Patent: Nov. 10, 2009

(54) HYDRAULIC TRANSMISSION

(75) Inventor: Jurgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 267 days.

(21) Appl. No.: 11/663,034

(22) PCT Filed: Jul. 6, 2005

(86) PCT No.: PCT/EP2005/007271

§ 371 (c)(1),
(2), (4) Date: Mar. 15, 2007

(87) PCT Pub. No.: WO2006/029664

PCT Pub. Date: Mar. 23, 2006

(65) Prior Publication Data

US 2007/0295006 A1     Dec. 27, 2007

(30) Foreign Application Priority Data

Sep. 15, 2004     (DE) ................. 10 2004 044 510

(51) Int. Cl.
*F16D 31/02* (2006.01)
*F15B 11/02* (2006.01)

(52) U.S. Cl. .................. 60/483; 60/489; 91/519

(58) Field of Classification Search ............ 60/443, 60/483, 484, 489; 91/519, 530
See application file for complete search history.

(56) References Cited

U.S. PATENT DOCUMENTS

| | | | |
|---|---|---|---|
| 3,438,201 A |   | 4/1969 | Nash et al. |
| 3,908,517 A | * | 9/1975 | Wenbourne .............. 91/497 |
| 4,244,184 A |   | 1/1981 | Baldauf et al. |
| 4,561,250 A | * | 12/1985 | Aoyagi et al. .............. 60/483 |
| 5,159,992 A |   | 11/1992 | Reinecke et al. |
| 7,082,760 B2 | * | 8/2006 | Legner et al. .............. 60/484 |

FOREIGN PATENT DOCUMENTS

| | | |
|---|---|---|
| DE | 39 07 633 A1 | 9/1990 |
| DE | 100 34 752 A1 | 8/2002 |
| DE | 20 2004 009 766 U1 | 10/2004 |
| DE | 20 2004 009 767 U1 | 10/2004 |
| EP | 0 483 543 A1 | 5/1992 |
| GB | 2 101 720 | 1/1983 |
| JP | 06-074206 | 3/1994 |
| JP | 11-230307 | 8/1999 |

* cited by examiner

*Primary Examiner*—Michael Leslie
(74) *Attorney, Agent, or Firm*—Davis & Bujold, P.L.L.C.

(57) ABSTRACT

A hydraulic transmission system features a first hydrostatic motor (1) and a second hydrostatic motor (4), which are connected to an output shaft (3) by way of a compound transmission, and which, in order to reach a minimum and a maximum rotation speed of the output shaft, are, on the one hand, adjustable with respect to their displacement volume by way of electric valves (9, 17) and, on the other hand, can be connected or, as the case may be, separated from a conveyor line (7) and a suction line (8) of a hydraulic pump.

9 Claims, 2 Drawing Sheets

HYDRAULIC TRANSMISSION

This application is a national stage completion of PCT/EP2005/007271 filed Jul. 6, 2005, which claims priority from German Application Serial No. 10 2004 044 510.9 filed Sep. 15, 2004.

FIELD OF THE INVENTION

The invention applies to a hydraulic transmission system.

BACKGROUND OF THE INVENTION

Generic transmission systems consist of at least two hydraulic motors that are interconnected by way of a compound transmission, and which drive one output shaft.

DE 39 07 633 C2 discloses a continuously variable, hydrostatic traction drive with a first and a second hydraulic motor which are interconnected in a compound transmission, and drive an output shaft, which is connected to the drive gears of the motor vehicle. In order to drive in different speed ranges, the displacement volume of a hydraulic motor is alterable, and this hydraulic motor can be completely uncoupled from the power flow with the output shaft.

EP 0 483 543 B1 discloses a hydrostatic drive with two hydraulic motors, which are interconnected in a compound transmission, and which drive an output shaft by way of several switchable gear reduction units. In order to drive in different speed ranges, the displacement volumes of the motors are variable, and the hydrostatic motors can be connected to different gear reduction degrees.

The invention is based on the task of creating a hydraulic transmission system comprised of at least two hydrostatic motors that are interconnected in a compound transmission and drive an output shaft, whereby at least one hydrostatic motor has an adjustable displacement volume and the activation of the hydraulic transmission is simply and cost-efficiently executed.

SUMMARY OF THE INVENTION

In the invention, a hydraulic motor is hydraulically separated from the source of the pressure medium by way of an electrically actuated valve that connects the pressure medium supply and return lines of the hydraulic motor with a pressure medium reservoir. As this valve is only activated when the hydraulic motor is driven near its zero displacement, it is possible to use an electrically switchable valve, because in this operating state no large pressure medium flow has to be switched on or off using the valve. The turn-off device thus requires little switching force and can therefore be directly controlled by way of an electrically actuated valve. The electrically actuated valve is preferably actuated by way of at least one switching magnet.

In a further embodiment of the invention, the electrically actuated valve, when connected to the power supply, is switched by way of a spring to connect the hydrostatic motor to the pressure medium source. By switching off the current to the electrically actuated valve, the hydraulic motor can be disconnected from the hydraulic pump.

In a further embodiment of the invention, the hydraulic adjustment of the stroke displacement of the hydraulic motor is simplified by having the displacement volume adjustment mechanism of the hydraulic motor consist of one electrically actuated valve, which drives a cylinder/piston unit that adjusts the displacement volume of the hydraulic motor. Because the high pressure ahead of and behind the valve has no retroaction on the valve piston, a small actuating force is sufficient. Through the use of electrically actuated valves, which act directly on the valve slide, control is simplified and there is higher precision in the adjustment, because the elements that are subject to tolerance, such as pilot valves, are dispensed with in connection with hydraulic valves.

In one embodiment of the invention, the hydraulic motors are comprised of radial piston motors, in which the adjusting cylinders for changing the displacement volume are preferably disposed on the crankshaft. This results in small adjusting cylinders and small adjustment volume flows. The high pressure on the adjusting valve produced by the hydraulic motor has no retroaction, and the actuating force is therefore small. This makes it possible to dispense with pilot operation of this valve and to configure this value as electrically actuated. In a further embodiment of the invention, the valve pistons of this electrically actuated valve for adjusting the displacement volume of the motor are controlled directly by way of proportional magnets.

BRIEF DESCRIPTION OF THE DRAWINGS

The invention will now be described, by way of example, with reference to the accompanying drawings in which.

DETAILED DESCRIPTION OF THE INVENTION

Figure 1:
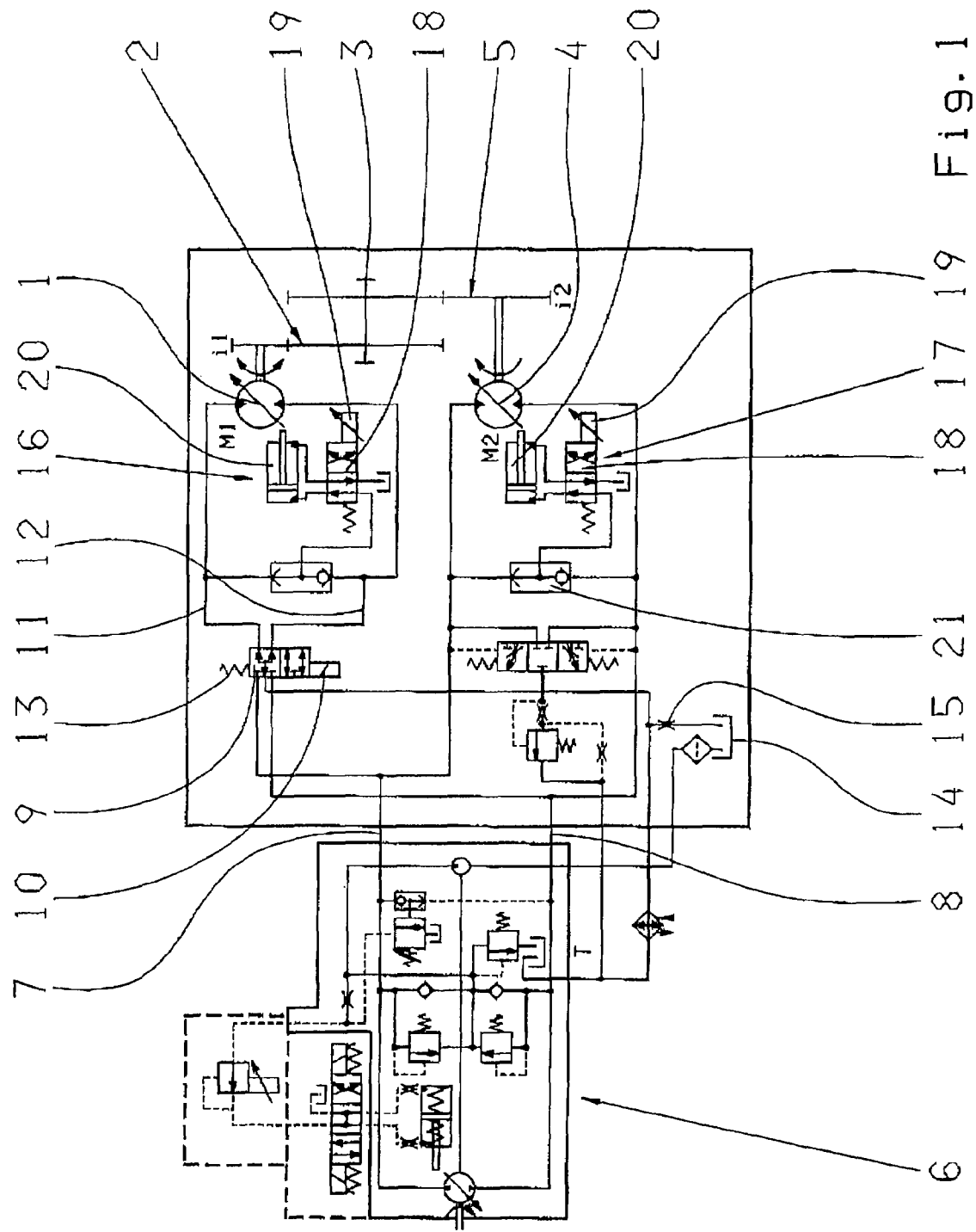
FIG. 1 is a hydraulic transmission system with a non-switchable compound transmission.
Figure 2:
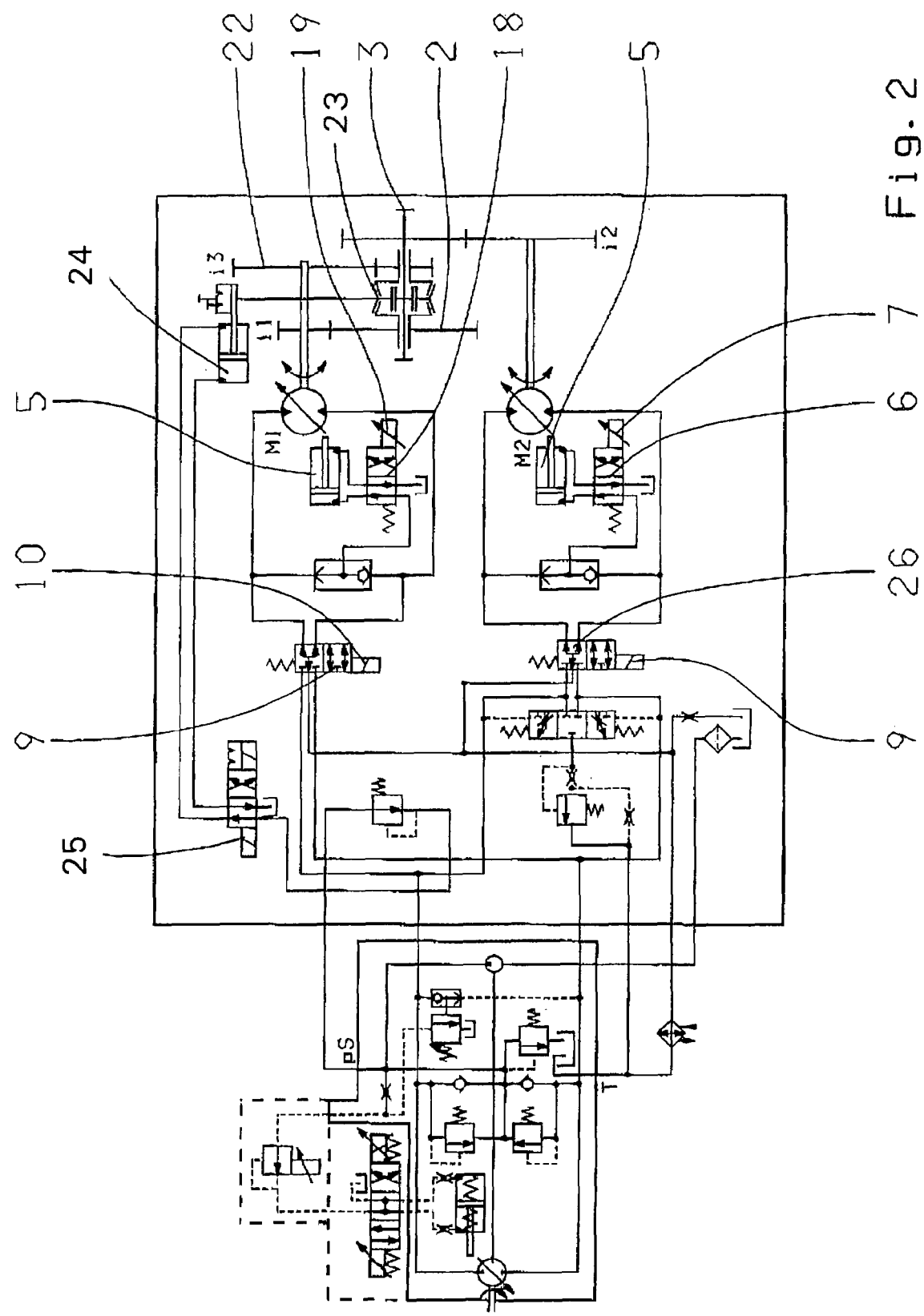
FIG. 2 is a hydraulic transmission system with a switchable compound transmission system.

FIG. 1:

A first hydrostatic motor 1 is constructed with an adjustable displacement volume and drives the output shaft 3 by way of a first step reduction gear 2. A second hydrostatic motor 4, which is constructed with an adjustable displacement volume, drives the output shaft 3 by way of a second step reduction gear 5. An adjustable hydraulic pump 6 has a conveyer line 7 and a suction line 8, depending on the direction of rotation. When the current is on, an electrically actuated valve 9 connects the conveyer line 7 via the switching magnet 10 to the pressure medium supply line 11, and the suction line 8 to the pressure medium supply return 12. If the switching magnet 10 is not electrified, the spring 13 slides the valve into the other switching position, in which the pressure medium supply line 11 and the pressure medium return line 12 are connected to the pressure medium reservoir 14, whereby there is preferably a choke 15 arranged between the pressure medium reservoir 14 and the pressure medium supply line 11 and the pressure medium return line 12, in order to maintain a minimum pressure. The electrically actuated valve 9 is preferably only activated when the first hydrostatic motor 1 has a swept volume that is near zero. This ensures that there is virtually no pressure medium flow through valve 9, which means that when actuating the valve 9, no major pressure medium flow is released or cut off. The valve 9 can therefore be electrically actuated.

The first hydrostatic motor 1 and the second hydrostatic motor 4 are constructed with adjustable displacement volume, the adjustment units 16 and 17 adjusting the displacement volume. The adjustment units 16 and 17 are in principle identically constructed, which is why only one displacement volume adjustment unit is described. The electrically adjustable valve 18 preferably has proportional valves 19, by way of which the adjusting cylinder 20 can be adjusted corresponding to the current applied to the proportional valve 19. Through the use of radial hydrostatic motors, there is the possibility of arranging the adjusting cylinder 20 in the crankshaft, whereby the diameter can be kept small and no reset forces from the high pressure of the hydrostatic motor can act on the electrically actuatable valve 17. There is then the possibility of configuring the electrically actuatable valve 17 as electrically actuatable. By way of a valve 21, the electrically actuatable valve 17 maintains the high pressure of the hydraulic pump 6, in order to control the adjusting cylinder 20 with the pressure. By using the electrically actuated valves 17 and 9, the hydraulic control can be constructed simply and cost-efficiently, and the precision of the hydraulic control is increased, as tolerances from pilot valves cannot have a negative effect.

When the hydraulic transmission is driven at low speed and high torque, the electrically actuatable valve 9 is electrified, whereby the conveyer line 7 is connected with the pressure medium supply line 11 and the suction line 8 with the pressure medium return line 12; and by swiveling out the first hydrostatic motor 1 and the second hydrostatic motor 4, a high torque and a low speed are achieved. When the maximum allowable speed of the first hydrostatic motor 1 is reached during pressurization, the first hydrostatic motor 1 is adjusted to a swept volume near zero, and then the current to the electrically actuatable valve 9 is shut off, whereupon the spring 13 reverses the valve, and only very low pressure is built up in the first hydrostatic motor 1. With this low pressure, the first hydrostatic motor 1 can also be run at higher speeds. The hydraulic transmission system or, as the case may be, its output shaft 3 can then be operated above an allowable speed for the first hydrostatic motor 1 with the application of pressure.

FIG. 2:

Components having the same reference symbols as the components in FIG. 1 perform the same functions, which is why reference is made to the description of FIG. 1. The first hydrostatic motor 1 is configured as combinable with the output shaft 3 with a first step reduction gear 2 and a third step reduction gear 22. A mechanical switching device 23, for example a synchronization, is actuated via the cylinder 24, by way of which the first hydrostatic motor 1 can be connected with the output shaft 3, either via the first step reduction gear 2 or the third step reduction gear 22. The cylinder 24 is controlled by way of the electrically actuatable valve 25. In order to achieve the maximum torque in starting gear, the displacement volume devices 16 and 17 are adjusted so that the first motor 1 and the second motor 4 are at their maximum displacement volumes. The control unit 23 is adjusted so that the control unit 23 connects the first hydrostatic motor 1 via the first step reduction gear 2 with the output shaft 3. In order to reach the maximum final rotation speed of the output shaft 3, the second hydrostatic motor 4 is uncoupled via the electric actuating valve 26 from the hydraulic pump 6, or, as the case may be, its conveyor line 7 and suction line 8, and the first hydrostatic motor 1 is connected via the electric actuating valve 9 with the conveyor line 7 and the suction line 8 of the pump and adjusted to a small displacement volume using the electric valve 18. The second hydrostatic motor 4 is then driven above its allowable rotation speed with additional pressure, whereupon the output shaft 3 reaches its maximum rotation speed. Rotation speeds of the output shaft 3 between the maximum rotation speed and the starting rotation speed are reached by connecting the first hydrostatic motor 1 with the output shaft 3 via the first step reduction gear 2 or the third step reduction gear 22; and the first hydrostatic motor 1 is switched on or off via the electric actuating valve 9 and the second hydrostatic motor 4 via the electric actuating valve 26. The actuation of the electric valves 9 and 26 is carried out by way of the almost zero-displacement volume of the respective hydrostatic motor 1 or 4. This guarantees that no flow or, as the case may be, only a small flow of pressure medium is present when the electric valve 9 or, as the case may be, 26 is switched.

REFERENCE NUMERALS 1 first hydrostatic motor
2 first step reduction gear
3 output shaft
4 second hydrostatic motor
5 second step reduction gear
6 hydraulic pump
7 conveyor line
8 suction line
9 electrically actuatable valve
10 switching magnet
11 pressure medium supply line
12 pressure medium return line
13 spring
14 pressure medium reservoir
15 throttle
16 displacement volume adjustment unit
17 displacement volume adjustment unit
18 electrically adjustable valve
19 proportional valve
20 adjusting cylinder
21 valve
22 third step reduction gear
23 switching device
24 cylinder
25 electrically actuatable valve
26 electrically actuatable valve

The invention claimed is:

1. A hydraulic transmission system comprising:
a first radial piston hydraulic motor (1) which adjustably displaces a first volume of pressure medium for driving an output shaft (3), and a second radial piston hydraulic motor (4) which adjustably displaces a second volume of the pressure medium for driving the output shaft (3);
the first radial piston hydraulic motor (1) communicates with a valve (9) via a pressure medium supply line (11) and a pressure medium return line (12);
a hydraulic pump (6) communicates with the valve (9) via a conveyor line (7) and a suction line (8);
the valve (9), in a first switching position, connects the conveyor line (7) with the pressure medium supply line (11) and the suction line (8) with the pressure medium return line (12);
the valve (9), in a second switching position, connects the pressure medium supply line (11) and the pressure medium return line (12) with a pressure medium reservoir (14);
the valve (9) is electrically actuated to switch from the first switching position to the second switching position and from the second switching position to the first switching position only when substantially none of the first volume of pressure medium is displaced by the first hydraulic motor (1).

2. The hydraulic transmission system according to claim 1, wherein the valve (9) is electrically actuated via at least one switching magnet (10).

3. The hydraulic transmission system according to claim 1, wherein the valve (9), in a non-electrified state, Is actuated by a reset spring to switch from the first switching position to the second switching position.

4. The hydraulic transmission system according to claim 1, wherein the first radial piston hydraulic motor (1) and the second radial piston hydraulic motor (4) are coupled to the output shaft (3).

5. The hydraulic transmission according to claim 2, wherein the valve (9), in a non-electrified state, is actuated by a reset spring to switch from the first switching position to the second switching position.

6. A hydraulic transmission system comprising:
a first hydraulic motor (1), which adjustably displaces a first volume of pressure medium for driving an output shaft (3), and a second hydraulic motor (4), which adjustably displaces a second volume of the pressure medium for driving the output shaft (3):
the first hydraulic motor (1) has a pressure medium supply line (11) and a pressure medium return line (12) communicating with a valve (9); and
a hydraulic pump (6) has a conveyor line (7) and a suction line (8) communicating with the valve (9);
wherein in a first switching position, the valve (9) connects the conveyor line (7) with the pressure medium supply line (11) and the suction line (8) with the pressure medium return line (12); and
in a second switching position, the valve (9) connects the pressure medium supply line (11) and the pressure medium return line (12) with a pressure medium reservoir (14); and
the valve (9) is electrically actuated to switch from the first switching position to the second switching position and from the second switching position to the first switching position only when substantially none of the first volume of pressure medium is displaced by the first hydraulic motor (1); and
a displacement volume adjustment unit (16) of the first hydraulic motor (1) comprises an electrically actuatable valve (18) which controls a cylinder/piston unit (20), that adjusts the first displacement volume of pressure medium.

7. The hydraulic transmission system according to claim 6, wherein the electrically actuatable valve (18) is a proportional valve which has proportional magnets (19).

8. The hydraulic transmission system according to claim 6, wherein the second hydraulic motor (4) comprises a displacement volume adjustment unit (17) with an electrically actuatable valve (18).

9. A hydraulic transmission system comprising:
a first radial piston hydraulic motor (1). which adjustably displaces a first volume of pressure medium for driving and output shaft (3), and a second radial piston hydraulic motor (4) which adjustably displaces a second volume of the pressure medium for driving the output shaft (3);
the first radial piston hydraulic motor (1) communicates with a first valve (9), via a first pressure medium supply line (110 and a first pressure medium return line (12);
the second radial piston hydraulic motor (4) communicates with a second valve (9), via a second pressure medium supply lien (11) and a second pressure medium return line (12);
a hydraulic pump (6) communicates with the first valve (9) and the second valve (9), via a conveyor line (7) and a suction line (8);
the first valve (9), in a first switching position, connects the conveyor line (7) with the first pressure medium supply line (11) and the suction line (8) with the first pressure medium return line (12);
the first valve (9), in a second switching position, connects the first pressure medium supply line (11) and the first pressure medium return line (12) with a pressure medium reservoir (14);
the first valve (9) is electrically actuated to switch form the first switching position to the second switching position and form the second switching position to the first switching position only when substantially none of the first volume of pressure medium is displaced by the first radial piston hydraulic motor (1);
the second valve (9), in a first switching position, connects the conveyor line (7) with the second pressure medium supply line (11) and the suction line (8) with the second pressure medium return line (12);
the second valve (9), in a second switching position, connects the second pressure medium supply lien (11) and the second pressure medium return line (12) with the pressure medium reservoir (14); and
the second valve (9) is electrically actuated to switch from the first switching position to the second switching position and from the second switching position to the first switching position only when substantially none of the second volume of pressure medium is displaced by the second radial piston hydraulic motor (4).

* * * * *